US012580291B2

(12) United States Patent
Jensen et al.

(10) Patent No.: US 12,580,291 B2
(45) Date of Patent: Mar. 17, 2026

(54) HIGHLY-INTEGRATED ANTENNA FEED ASSEMBLY

(71) Applicant: ViaSat, Inc., Carlsbad, CA (US)

(72) Inventors: Anders Jensen, Johns Creek, GA (US); John L. Beafore, Buford, GA (US)

(73) Assignee: Viasat, Inc., Carlsbad, CA (US)

( * ) Notice: Subject to any disclaimer, the term of this patent is extended or adjusted under 35 U.S.C. 154(b) by 304 days.

(21) Appl. No.: 18/551,728

(22) PCT Filed: Mar. 30, 2022

(86) PCT No.: PCT/US2022/022647
§ 371 (c)(1),
(2) Date: Sep. 21, 2023

(87) PCT Pub. No.: WO2022/212580
PCT Pub. Date: Oct. 6, 2022

(65) Prior Publication Data

US 2024/0055743 A1 Feb. 15, 2024

Related U.S. Application Data

(60) Provisional application No. 63/168,051, filed on Mar. 30, 2021.

(51) Int. Cl.

| | |
|---|---|
| ***H01P 1/213*** | (2006.01) |
| ***H01P 1/161*** | (2006.01) |
| ***H01P 5/19*** | (2006.01) |
| ***H01Q 1/28*** | (2006.01) |
| ***H01Q 21/00*** | (2006.01) |

(52) U.S. Cl.
CPC ............ *H01P 1/2138* (2013.01); *H01P 1/161* (2013.01); *H01P 5/19* (2013.01); *H01Q 1/288* (2013.01); *H01Q 21/0006* (2013.01)

(58) Field of Classification Search
CPC ...... H01P 1/2138; H01P 1/213; H01P 1/2131; H01P 1/161; H01P 1/165; H01P 1/17; H01P 1/171; H01P 5/19; H01P 5/20; H01P 5/12; H01P 5/16; H01P 5/227; H01Q 21/0006; H01Q 21/0037; H01Q 9/045; H01Q 1/288
See application file for complete search history.

(56) References Cited

U.S. PATENT DOCUMENTS

| | | | | |
|---|---|---|---|---|
| 4,504,805 A * | 3/1985 | Ekelman, Jr. | ......... | H01P 1/2138 333/135 |
| 6,181,222 B1 * | 1/2001 | Seewig | ................ | H01P 1/2131 343/756 |
| 7,330,088 B2 | 2/2008 | Aramaki et al. | | |

(Continued)

OTHER PUBLICATIONS

International Search Report and Written Opinion for App No. PCT/US2022/022647, Jul. 13, 2022, 13 pages.

*Primary Examiner* — Stephen E. Jones
(74) *Attorney, Agent, or Firm* — Murphy, Bilak & Homiller, PLLC

(57) ABSTRACT

A multi-layer, highly-integrated antenna feed assembly and a method of manufacturing a multi-layer, highly-integrated antenna feed assembly are described herein. The antenna feed assembly includes multiple polarization forming networks operable over different frequency bands. In an example embodiment, the antenna feed assembly includes five layers of conductive material. Alternatively, the number of layers may be different than five.

15 Claims, 12 Drawing Sheets

(56) References Cited

U.S. PATENT DOCUMENTS

| | | | | |
|---|---|---|---|---|
| 10,511,073 | B2 * | 12/2019 | Miller | H01P 11/003 |
| 12,230,876 | B1 * | 2/2025 | Wrigley | H01Q 1/50 |
| 12,237,560 | B2 * | 2/2025 | Wang | H01P 1/165 |
| 2008/0280583 | A1 | 11/2008 | Chattopadhyay et al. | |
| 2008/0315969 | A1 | 12/2008 | Tascone et al. | |
| 2010/0102899 | A1 | 4/2010 | Engel | |
| 2010/0149058 | A1 * | 6/2010 | Bosshard | H01P 1/161<br>343/756 |
| 2016/0006098 | A1 | 1/2016 | Hasegawa et al. | |

* cited by examiner

HIGHLY-INTEGRATED ANTENNA FEED ASSEMBLY

TECHNICAL FIELD

A multi-layer, highly-integrated antenna feed assembly and a method of manufacturing a multi-layer, highly-integrated antenna feed assembly are described herein.

BACKGROUND

Antenna feed assemblies couple radiofrequency transmitters or receivers with respective antennas and often include feed networks comprising waveguides, circulators or isolators, diplexers, polarization forming networks, etc. Weight and volume are critical constraints in many contexts involving the use of antenna feed assemblies, with satellite communication systems being one such context. A typical satellite may carry a plurality of antenna feed assemblies, corresponding to antenna systems used for communicatively coupling to terrestrial ground stations, such as gateways and user terminals.

Volume and weight savings multiply over the plurality of antenna feed systems included in the satellite. However, certain design requirements create tension in the context of size and weight reductions. For example, antenna feed assemblies used onboard satellites must exhibit high shock and vibration resistance and, in general, offer robust, reliable performance over multiple frequency ranges.

SUMMARY

A multi-layer, highly-integrated antenna feed assembly and a method of manufacturing a multi-layer, highly-integrated antenna feed assembly are described herein. The antenna feed assembly includes multiple polarization forming networks operable over different frequency bands. In examples herein, the antenna feed assembly includes five layers of conductive material. Alternatively, the number of layers may be different than five.

One embodiment comprises an antenna feed assembly that includes a first layer having a top surface and a bottom surface. The bottom surface of the first layer includes recesses that define portions of a first polarization-forming network. The first polarization-forming network includes a first pair of individual waveguides, a first hybrid including a first pair of ports coupled to the first pair of individual waveguides and further including a second pair of ports, a first filter of a first diplexer coupled to one of the second pair of ports, and a first filter of a second diplexer coupled to another of the second pair of ports.

The antenna feed assembly further includes a second layer having a top surface and a bottom surface. The top surface of the second layer extends across the recesses of the bottom surface of the first layer to form remaining surfaces of the first polarization-forming network. The bottom surface of the second layer includes recesses that define portions of a second polarization-forming network. The second polarization-forming network includes a second pair of individual waveguides, a second hybrid underlying the first hybrid and including a third pair of ports coupled to the second pair of individual waveguides and further including a fourth pair of ports, a second filter of the first diplexer coupled to one of the fourth pair of ports and underlying the first filter of the first diplexer, and a second filter of the second diplexer coupled to another of the fourth pair of ports and underlying the first filter of the second diplexer.

Another embodiment comprises a method of manufacturing an antenna feed assembly. The method includes forming a first layer having a top surface and a bottom surface. The bottom surface of the first layer includes recesses that define portions of a first polarization-forming network. The first polarization-forming network includes a first pair of individual waveguides, a first hybrid comprising a first pair of ports coupled to the first pair of individual waveguides and further comprising a second pair of ports, a first filter of a first diplexer coupled to one of the second pair of ports, and a first filter of a second diplexer coupled to another of the second pair of ports. The method further includes forming a second layer having a top surface and a bottom surface. The bottom surface of the second layer including recesses that define portions of a second polarization-forming network. The second polarization-forming network includes a second pair of individual waveguides, a second hybrid underlying the first hybrid and comprising a third pair of ports coupled to the second pair of individual waveguides and further comprising a fourth pair of ports, a second filter of the first diplexer coupled to one of the fourth pair of ports and underlying the first filter of the first diplexer, and a second filter of the second diplexer coupled to another of the fourth pair of ports and underlying the first filter of the second diplexer.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1A:
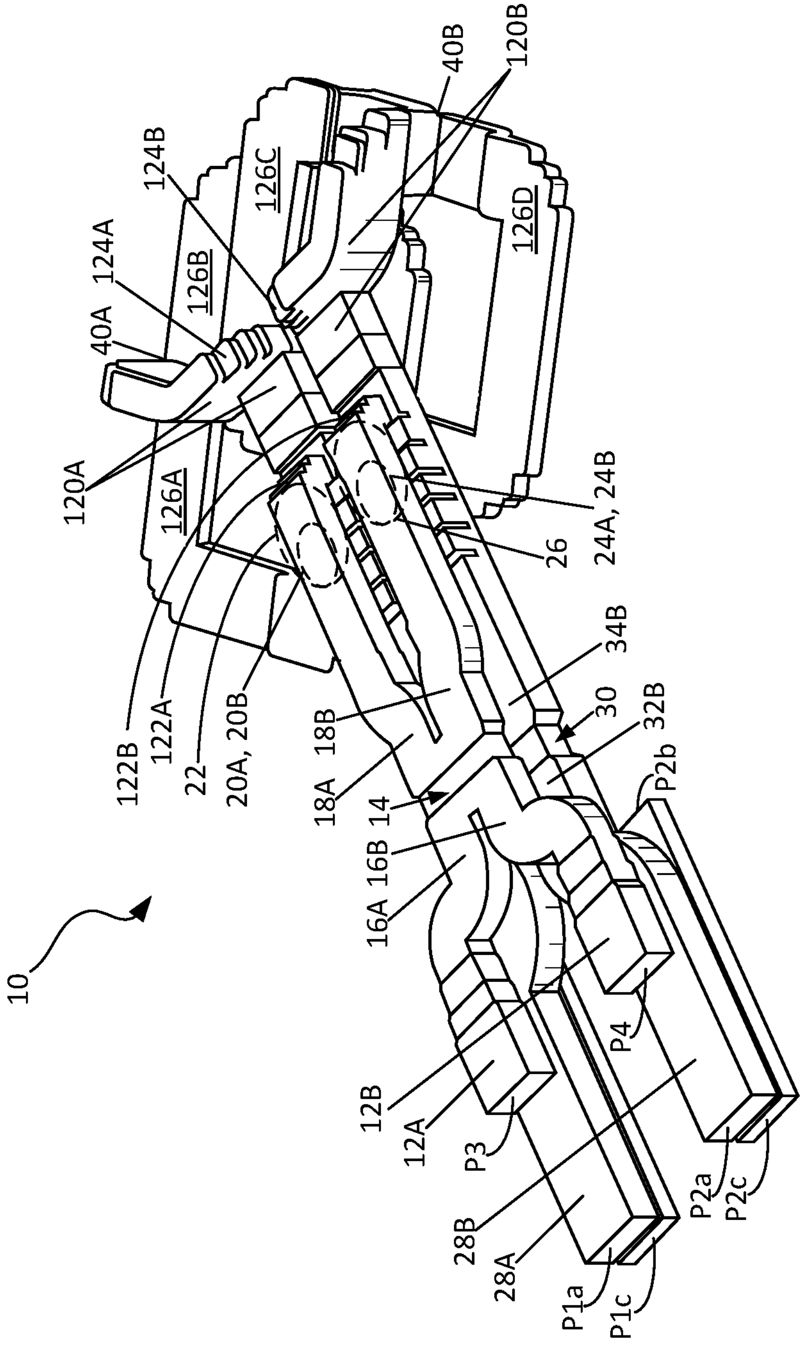
FIGS. 1A and 1B illustrate perspective views of an example electrical arrangement provided by a multi-layer antenna feed assembly, according to example embodiments.

FIG. 1A is a perspective-view of an "air model" view that depicts an example arrangement 10 of electrical elements provided by a multi-layer antenna feed assembly. The interplay between layer features formed through and in the respective layers in a stack of layers forms an antenna feed assembly comprising the depicted electrical elements. Here, the term "layer features" refers to any one or more of opposing surfaces, recesses, grooves, furrows, or apertures. Layer features present in the abutting surfaces of adjacent layers in the stack are complementary. For example, an opposing surface provided by one layer "covers" a recess or groove formed in the abutting surface of the adjacent layer to form a cavity or channel, e.g., a waveguide, while apertures provide inter-layer pathways.

Among the electrical elements, a first polarization-forming network includes a first pair of individual waveguides 12A and 12B, a first hybrid 14 including a first pair of ports 16A and 16B coupled to the first pair of individual waveguides 12A and 12B, and further including a second pair of ports 18A and 18B, a first filter 20A of a first diplexer 22 coupled to one of the second pair of ports 18A and 18B, and a first filter 24A of a second diplexer 26 coupled to another of the second pair of ports 18A and 18B.

Further among the electrical elements are a second polarization-forming network including a second pair of individual waveguides 28A and 28B, a second hybrid 30 underlying the first hybrid 14 and including a third pair of ports 32A and 32B coupled to the second pair of individual waveguides 28A and 28B, and further including a fourth pair of ports 34A and 34B, a second filter 20B of the first diplexer 22 coupled to one of the fourth pair of ports 34A and 34B and underlying the first filter 20A of the first diplexer 22, and a second filter 24B of the second diplexer 26 coupled to another of the fourth pair of ports 34A and 34B and underlying the first filter 24A of the second diplexer 26.

Figure 1B:
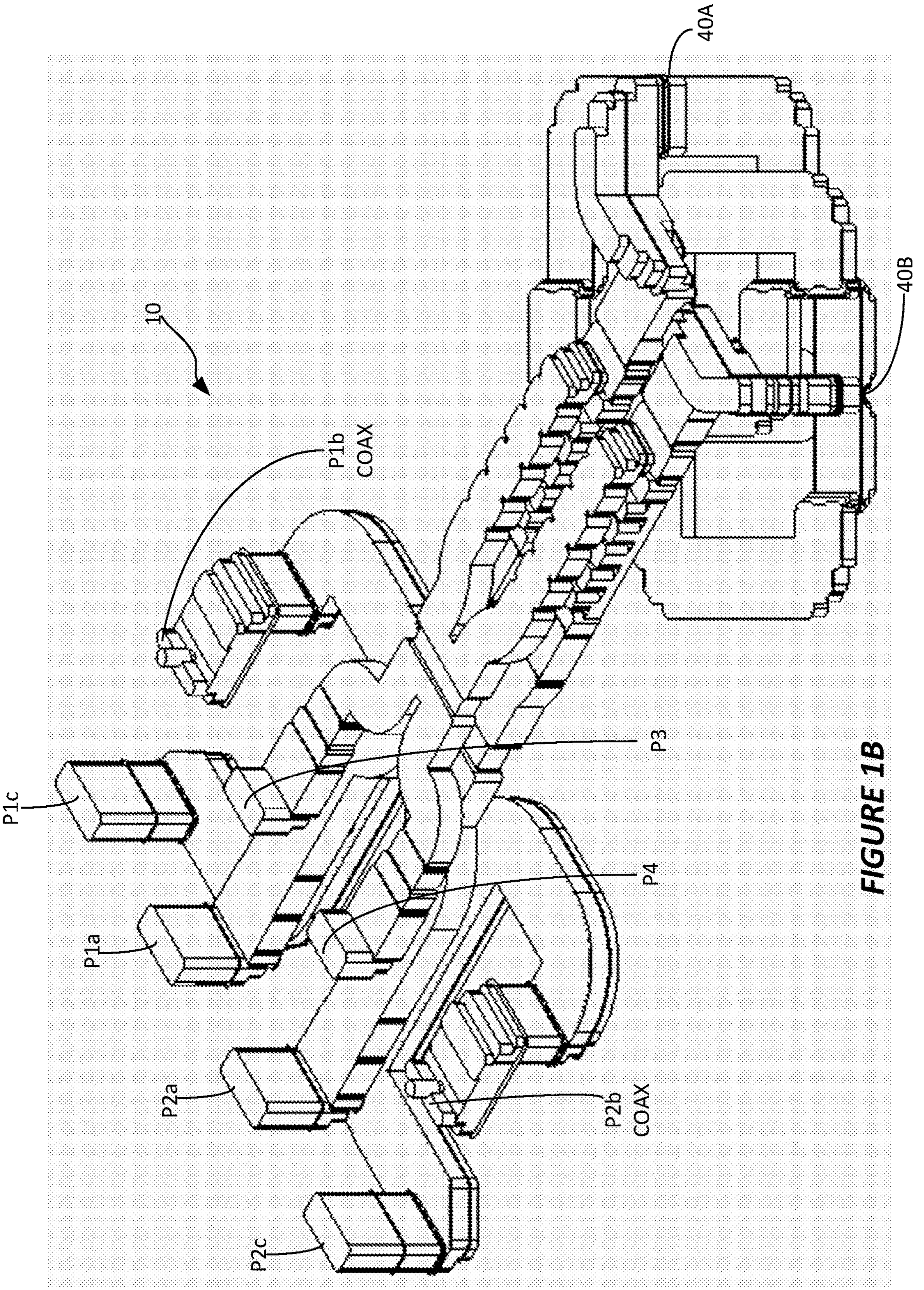

FIG. 1A also depicts a pair of TEE junctions 40A and 40B and selected ones of the overall set of assembly ports representing connection points (inputs and outputs) of the electrical arrangement 10. Illustrated ports include ports P1*a*, P2*a*, P2*b*, Plc, P2*c*, P3, and P4. Although port P1*b* is not visible in FIG. 1A, its position in relation to P1*a* is like that shown for P2*b* in relation to P2*a*. FIG. 1B offers an alternate perspective of the air-model introduced in FIG. 1A and illustrates selected additional example details regarding implementation of the ports P1*a*, P2*a*, P2*b*, Plc, P2*c*, P3, and P4.

Figure 2:
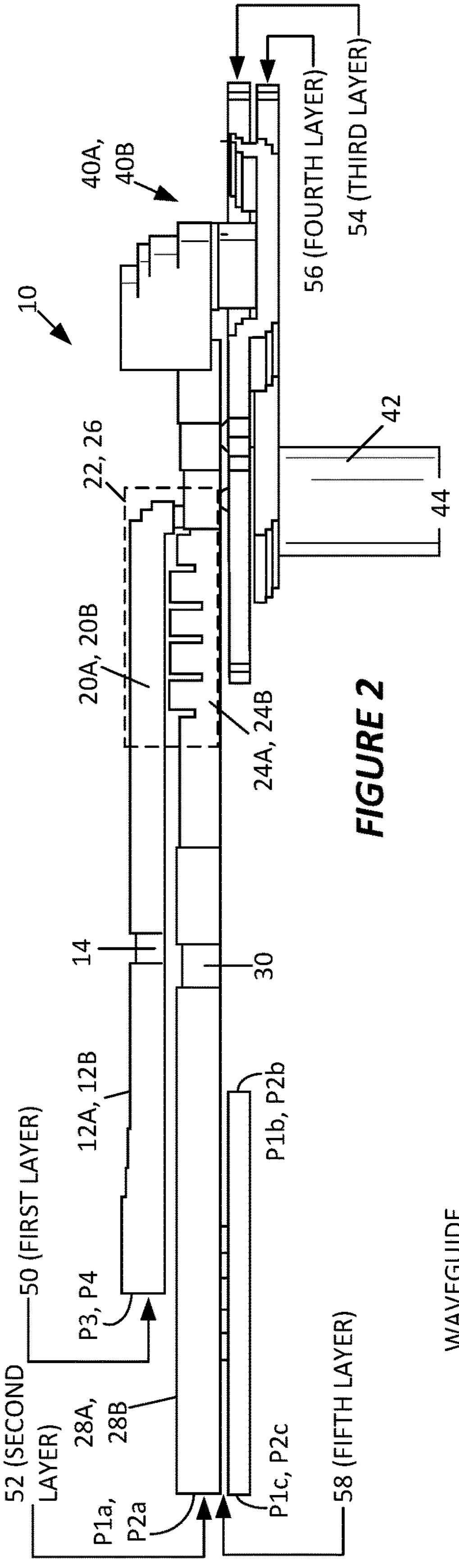
FIG. 2 illustrates a side view of the example electrical arrangement.

FIG. 2, which is a side view of air model shown in FIGS. 1A and 1B, also depicts the TEE junctions 40A and 40B and the ports P3, P4, P1*a*/P1*b*/P1*c* and P2*a*/P2*b*/P2*c*. FIG. 2 illustrates a turnstile junction 42, which may be referred to as a waveguide orthomode transducer. The turnstile junction 42 includes multiple ports, including a circular port 44.

Example layers going from the "top" of the example layer stack to the "bottom" of the example layer stack include a first layer 50, a second layer 52, a third layer 54, and a fourth layer 56. In one or more embodiments, the layer stack includes a fifth layer 58, positioned between the second layer 52 and the third layer 54. Each of the layers provides layer features or opposing surfaces or both, that are stack-wise complementary such that the aligned stack of layers 50, 52, 54, 56, and 58 form the cavities or passageways that comprise the electrical arrangement(s) described herein—i.e., the air-model representation depicted in FIGS. 1A, 1B and 2 correspond to the assembled stack.

Figure 3:
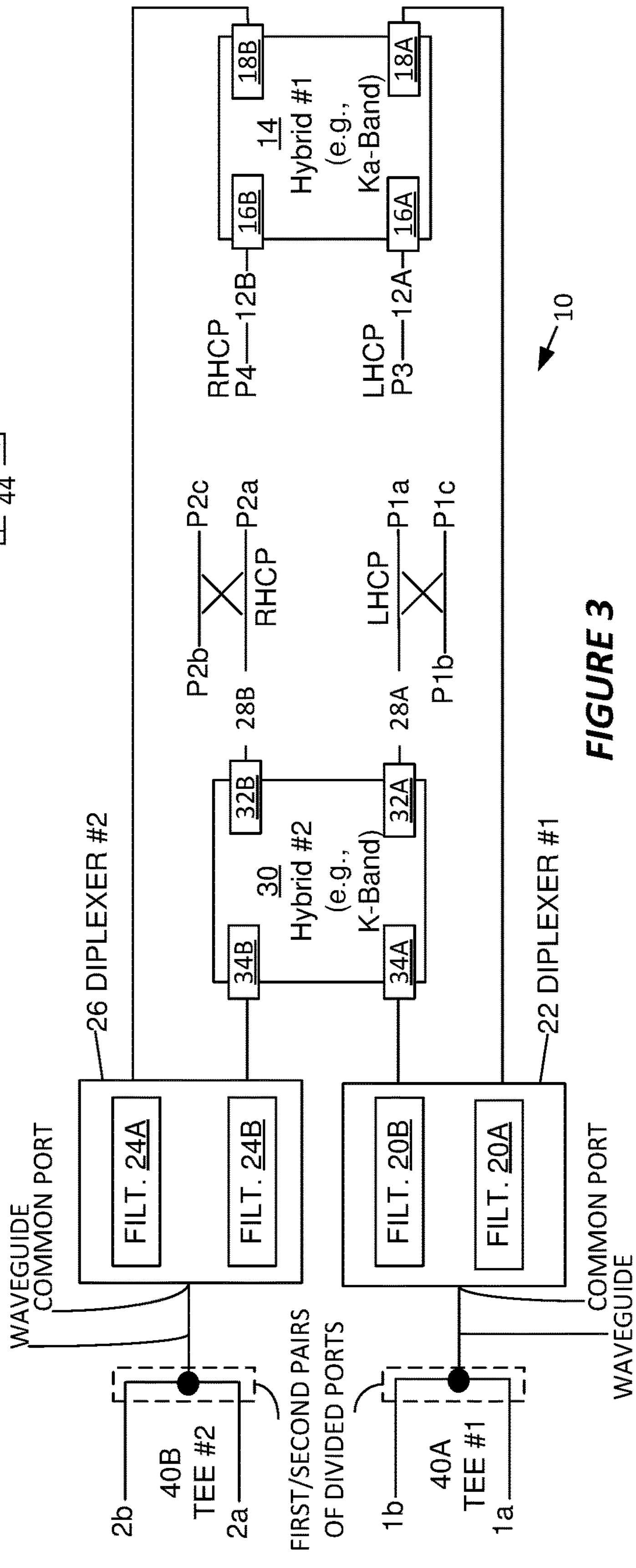
FIG. 3 is a schematic diagram of the example electrical arrangement.
Figure 4:
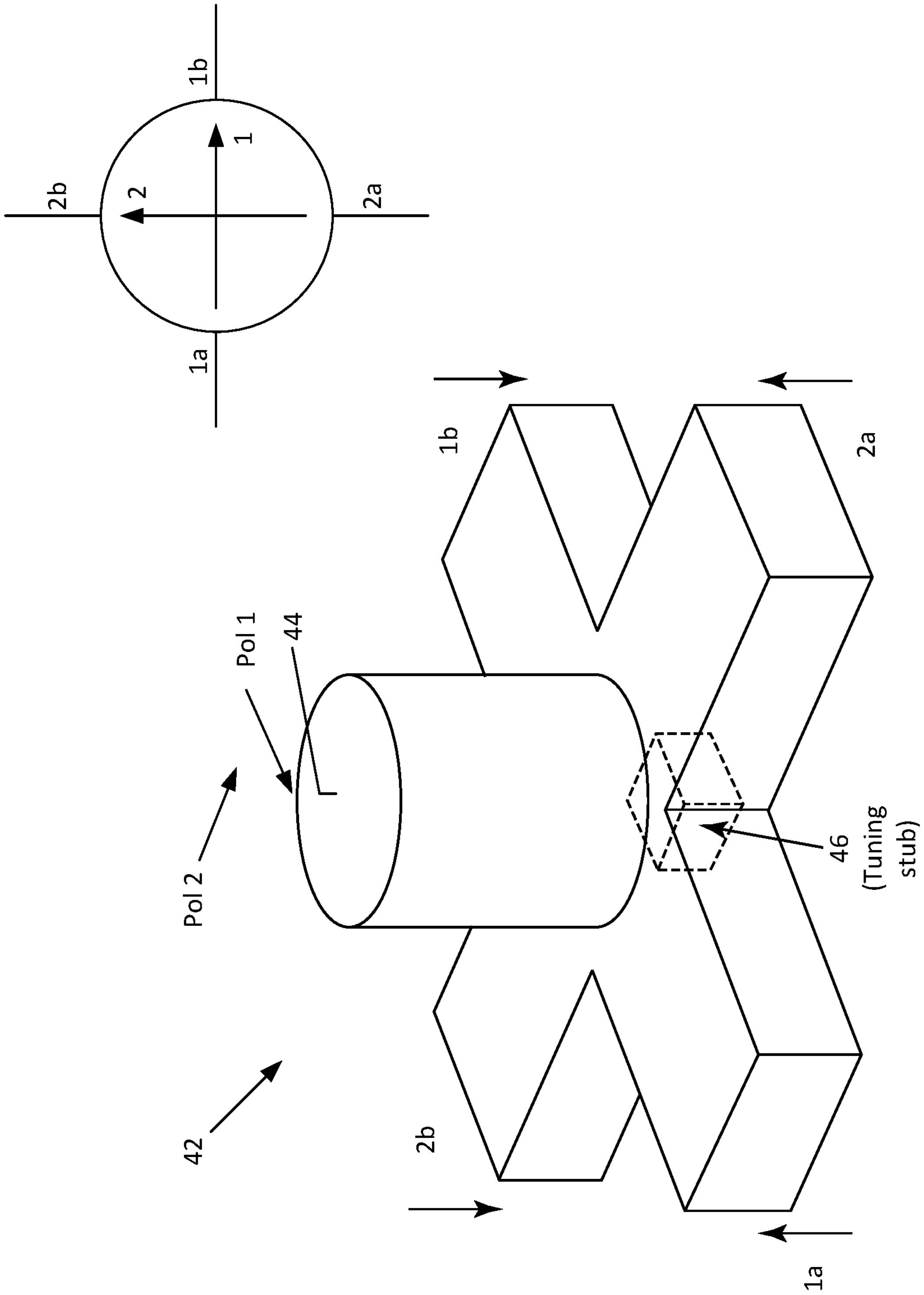
FIG. 4 illustrates a Turnstile Junction (Waveguide Orthomode Transducer).

FIG. 3 is a schematic diagram corresponding with the electrical arrangement 10 depicted in FIGS. 1A and 1B. The schematic illustrates the couplings between the TEE junctions 40A and 40B and the rectangular ports 1*a*, 1*b*, 2*a*, and 2*b* of the turnstile junction 42. FIG. 4 provides a corresponding perspective view of the turnstile junction 42, showing the circular port 44 and the respective rectangular ports 1*a*, 1*b*, 2*a*, and 2*b*. FIG. 4 further depicts a tuning stub 46 formed in or otherwise included in the turnstile junction 42.

Figure 5:
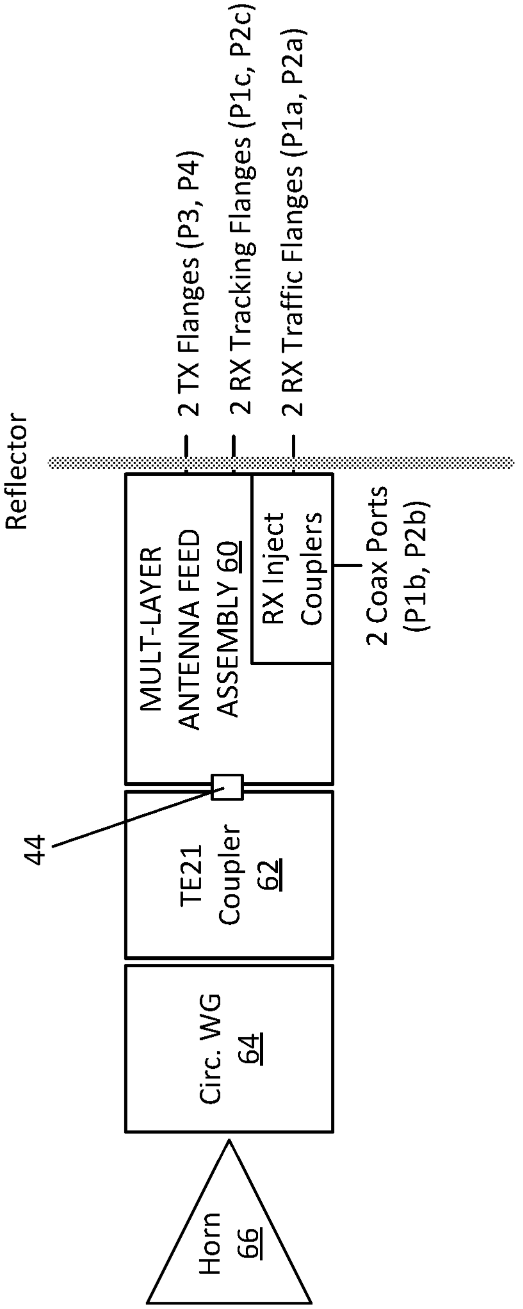
FIG. 5 is a block diagram of a multi-layer antenna feed assembly, in an example installation.

FIG. 5 illustrates a multi-layer antenna feed assembly 60 in an example installation, where the antenna feed assembly 60 is implemented as a highly-integrated assembly by virtue of its fabrication as a multi-layer stack that implements the electrical arrangement 10, according to the example details of FIGS. 1A and 1B and 2-4. The overall arrangement depicted in FIG. 5 includes the antenna feed assembly 60 having the circular port 44 coupled to a coupler 62, which in turn couples to a feed horn 66 through a circular waveguide 64.

In a ground-based antenna of a satellite communication system, the antenna feed assembly 60 may be configured for transmission in the Ka band and reception in the K band. The Ka/K frequency configuration may be reversed for use of the antenna feed assembly 60 onboard a satellite in the same satellite communication system.

FIG. 5 illustrates connectivity with respect to the ports shown in FIGS. 1A and 1B and 2-4, e.g., where ports P3 and P4 are transmission inputs to the antenna feed assembly 60. Ports P1*a* and P2*a* are reception outputs corresponding to received traffic signals, while ports Plc and P2*c* are reception ports tracking-signal reception, with ports P1*b* and P2*b* being related coaxial ports used for tracking-signal injection. Here, "tracking" refers to antenna tracking, and it shall be understood that additional circuitry and connections may be involved for implementation of an overall tracking system.

Figure 6B:
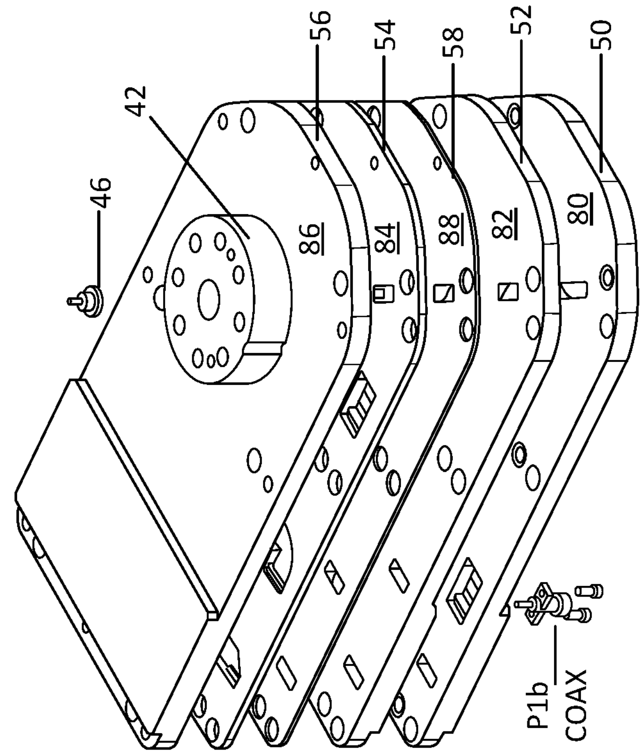
FIGS. 6A and 6B illustrate exploded top and bottom perspective views of the multiple layers used to form an antenna feed assembly, according to one embodiment.
Figure 6A:
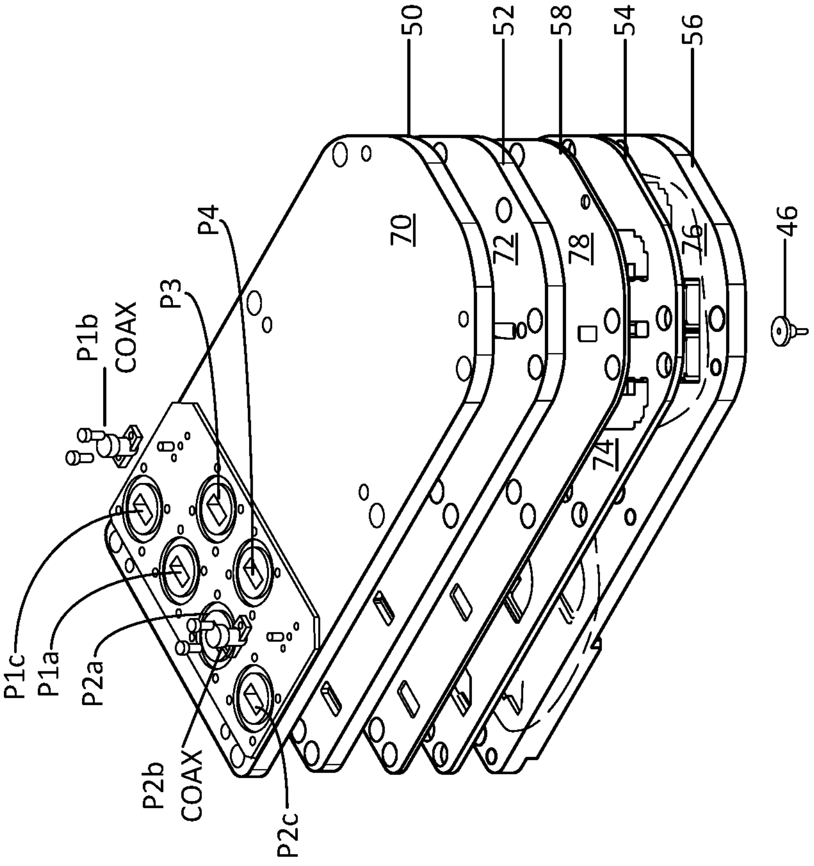

FIG. 6A illustrates the stack layers 50, 52, 54, 56, and 58 corresponding to FIGS. 1A, 1B, and 2, with the understanding that the assembled set of layers 50, 52, 54, 56, and 58 forms the antenna feed assembly 60. Each layer has a top and bottom surface, and respective ones of the layers include layer features that match with complementary layer features in an adjacent layer within the stack or are otherwise complemented by an opposing surface in the adjacent layer. For example, grooves, furrows, or other channels formed in the surface of one layer become waveguides, cavities, etc., when covered by the opposing surface of the adjacent layer. Similarly, apertures formed or machined through one layer provide signal passageways into adjacent layers above or below the layer. Thus, bringing the layers together in stack order forms the electrical arrangement 10 as a highly integrated arrangement that is compact and robust.

The perspective view of FIG. 6A shows the top surfaces of the respective layers in the stack. In more detail, the first stack layer 50 has a top surface 70, the second stack layer 52 has a top surface 72, the third stack layer 54 has a top surface 74, the fourth stack layer 56 has a top surface 76, and the fifth stack layer 58 has a top surface 78. As noted previously, the fifth stack layer 58 may be positioned between the second stack layer 52 and the third stack layer 54.

FIG. 6B illustrates the same layers 50, 52, 54, 56, and 58, but shows the bottom surfaces of the respective layers. The first stack layer 50 has a bottom surface 80, the second stack layer 52 has a bottom surface 82, the third stack layer 54 has a bottom surface 84, the fourth stack layer 56 has a bottom surface 86, and the fifth stack layer 58 has a bottom surface 88. The bottom perspective view of FIG. 6B also shows a portion of the turnstile junction 42, and depicts the tuning stub 46, according to the exploded view arrangement.

Figure 7A:
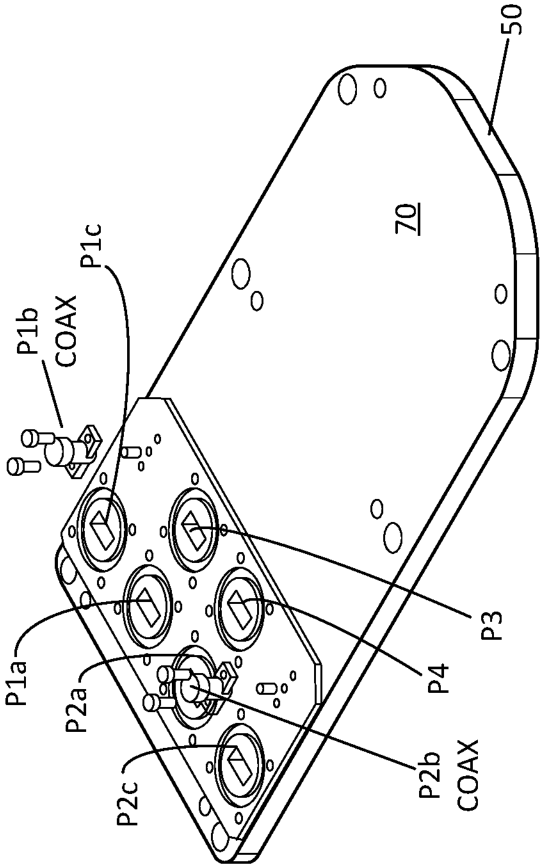
FIGS. 7A and 7B illustrate top and bottom perspective views of a first stack layer of the antenna feed assembly of FIGS. 6A and 6B.
Figure 7B:
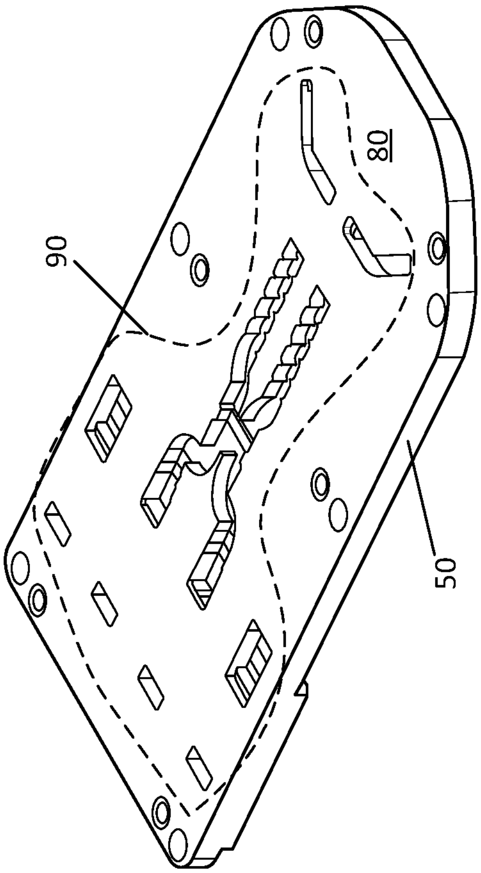

FIGS. 7A and 7B illustrate the first layer 50 in more detail. In particular, FIG. 7B illustrates a set of layer features 90 formed in the bottom surface 80 of the first layer 50, which form a portion of the first polarization-forming network. The layer features 90 include a mix of channels or recesses, along with selected apertures.

Figure 8B:
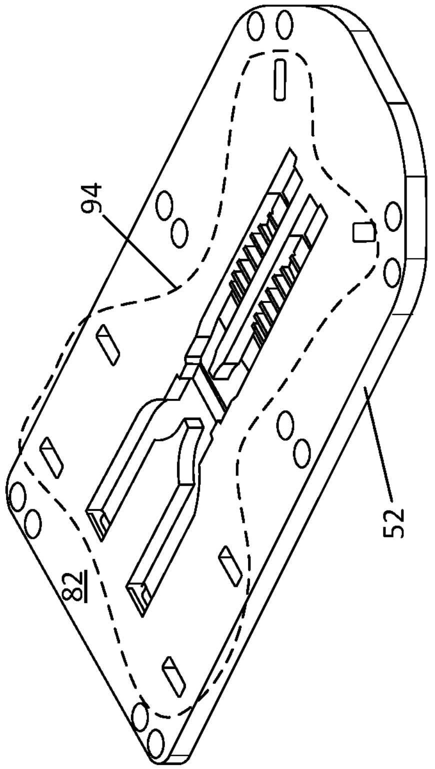
FIGS. 8A and 8B illustrate top and bottom perspective views of a second stack layer of the antenna feed assembly of FIGS. 6A and 6B.
Figure 8A:
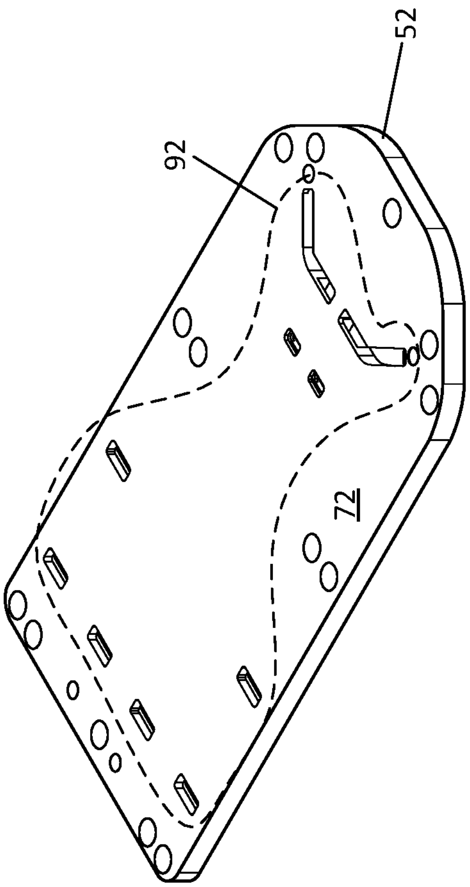

FIGS. 8A and 8B illustrate the second layer 52 in more detail. In particular, FIG. 8A illustrates the top surface 72 of the second layer 52, which has layer features 92 complementary with the bottom surface 80 of the first layer 50. FIG. 8B illustrates the bottom surface 82 of the second layer 52, which includes layer features 94 that define portions of the second polarization-forming network of the electrical arrangement 10.

Figure 9B:
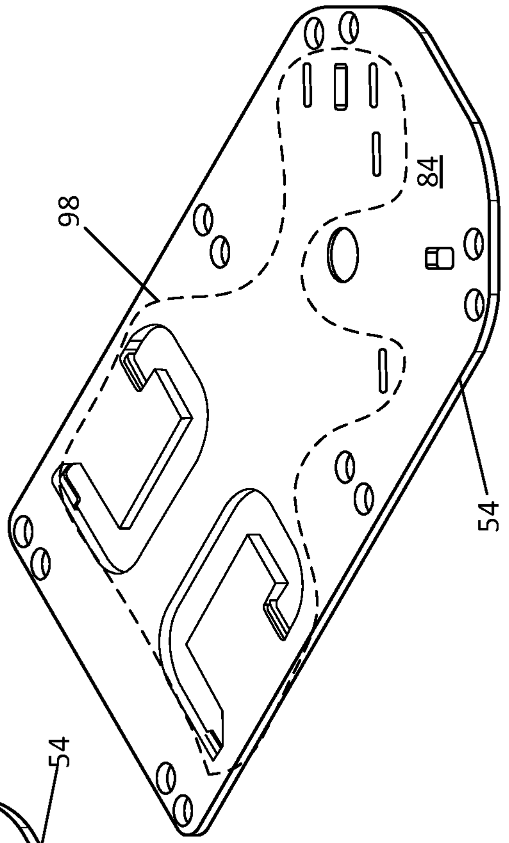
FIGS. 9A and 9B illustrate top and bottom perspective views of a third stack layer of the antenna feed assembly of FIGS. 6A and 6B.
Figure 9A:
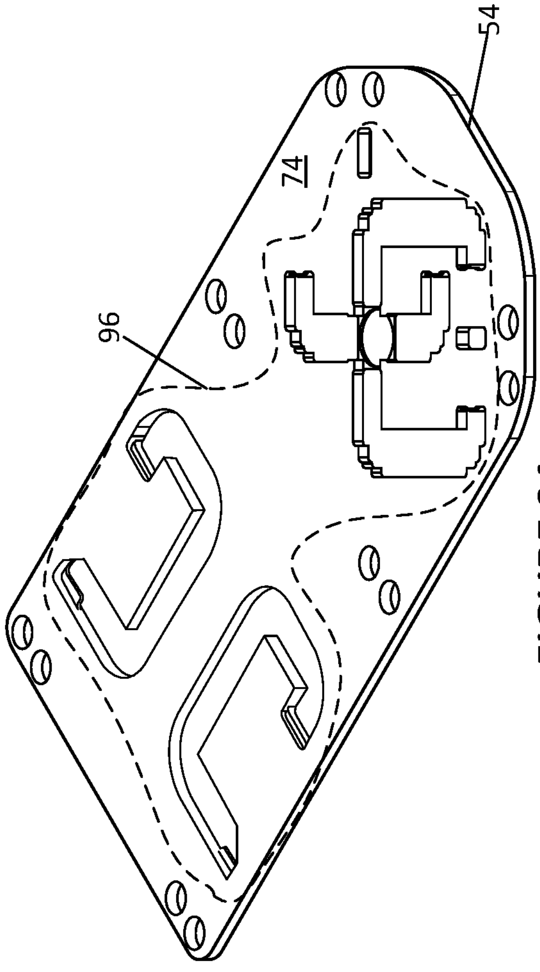

FIGS. 9A and 9B illustrate the third layer 54 in more detail. The top surface 74 of the third layer 54 has layer features 96, while the bottom surface 84 of the third layer 54 has layer features 98.

Figure 10B:
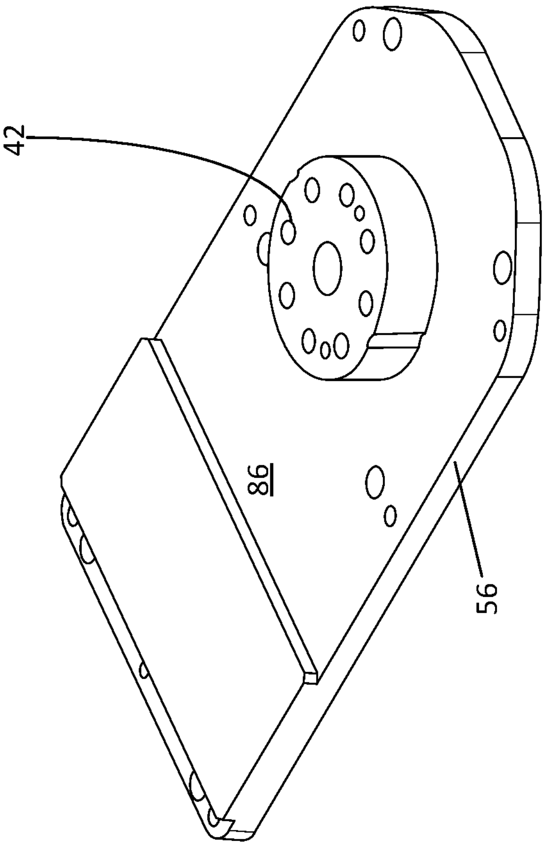
FIGS. 10A and 10B illustrate top and bottom perspective views of a fourth stack layer of the antenna feed assembly of FIGS. 6A and 6B.
Figure 10A:
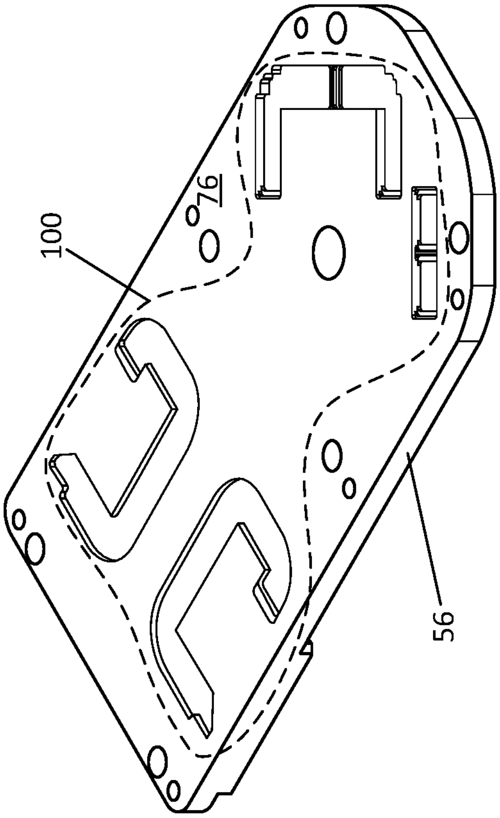

FIGS. 10A and 10B illustrate the fourth layer 56 in more detail. The top surface 76 of the fourth layer 56 has layer features 100.

Figure 11B:
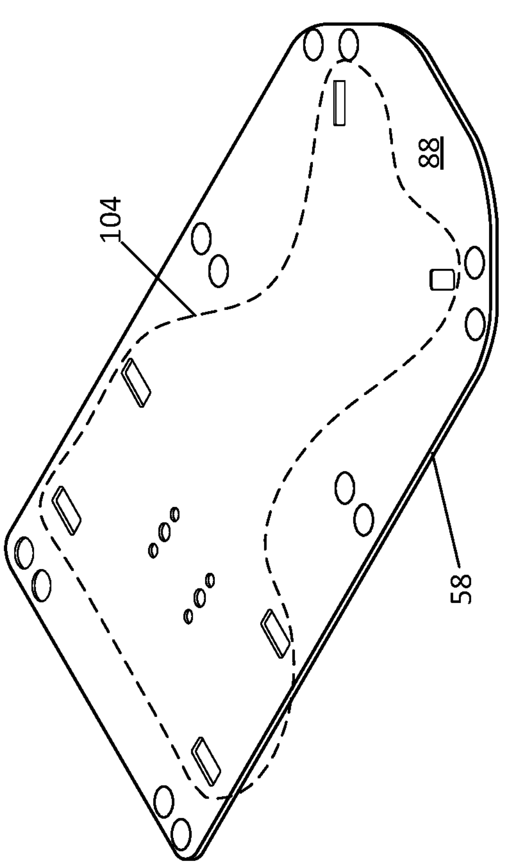
FIGS. 11A and 11B illustrate top and bottom perspective views of a fifth stack layer of the antenna feed assembly of FIGS. 6A and 6B.
Figure 11A:
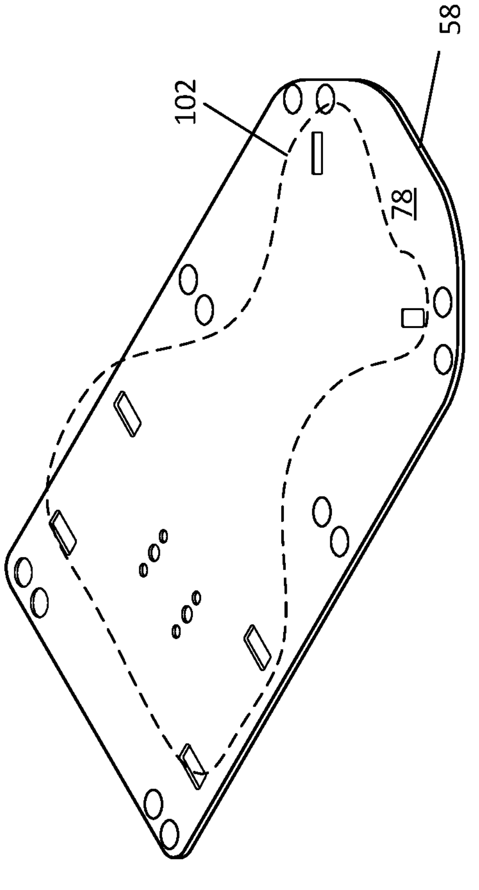

FIGS. 11A and 11B illustrate the fifth layer 58 in more detail. As noted, in stack order going from top to bottom, the fifth layer 58 may be positioned between the second layer 52 and the third layer 54. As such, the layer features 102 of the top surface 78 of the fifth layer 58 are complementary with respect to the layer features 94 on the bottom surface 82 of the second layer 52, and the layer features 104 on the bottom surface 88 of the fifth layer 58 are complementary with respect to the layer features 96 of the top surface 74 of the third layer 54.

With the above in mind and in an example embodiment, a multi-layer antenna feed assembly 60 comprises a plurality of layers that include layer features that are complementary when the layers are stacked in stack order, where the overall collection of layer features implements the electrical arrangement 10. Particularly, an example antenna feed assembly 60 includes a first layer 50 having a top surface 70 and a bottom surface 80. Layer features 90 of the bottom surface 80 of the first layer 50 includes recesses that define portions of a first polarization-forming network.

The first polarization-forming network includes a first pair of individual waveguides 12A and 12B, and a first hybrid 14. The first hybrid 14 comprises a first pair of ports 16A and 16B coupled to the first pair of individual waveguides 12A and 12B, and further comprises a second pair of ports 18A and 18B. The first polarization forming network further includes a first filter 20 of a first diplexer 22 coupled to one of the second pair of ports 18A and 18B, and a first filter 24A of a second diplexer 26 coupled to another of the second pair of ports 18A and 18B.

A second layer 52 of the antenna feed assembly 60 has a top surface 72 and a bottom surface 82. The top surface 72 of the second layer 52 extends across the recesses of the bottom surface 80 of the first layer 50 to form remaining surfaces of the first polarization-forming network. Further, layer features 94 of the bottom surface 82 of the second layer 52 include recesses that define portions of a second polarization-forming network.

The second polarization-forming network includes a second pair of individual waveguides 28A and 28B, and a second hybrid 30 underlying the first hybrid 14. The second hybrid 30 comprises a third pair of ports 32A and 32B coupled to the second pair of individual waveguides 28A and 28B, and further comprises a fourth pair of ports 34A and 34B.

The second polarization-forming network further includes a second filter 20B of the first diplexer 22 coupled to one of the fourth pair of ports 34A and 34B and underlying the first filter 20A of the first diplexer 22. Further, a second filter 24B of the second diplexer 26 is coupled to another of the fourth pair of ports 34A and 34B and underlies the first filter 24A of the second diplexer 26.

In some embodiments, a first individual waveguide of each of the first and second pairs of individual waveguides 12A/12B and 28A/28B is associated with a first circular polarization, a second individual waveguide of each of the first and second pairs of individual waveguides 12A/12B and 28A/28B is associated with a second circular polarization, a first port of each of the first and third pairs of ports 16A/16B and 32A/32B of the first and second hybrids 14 and 30 is associated with a first linear polarization, and a second port of each of the first and third pairs of ports 16A/16B and 32A/32B of the first and second hybrids 14 and 30 is associated with a second linear polarization.

In some embodiments, the antenna feed assembly 60 further includes a turnstile junction 42 including four side ports 1*a*, 1*b*, 2*a*, 2*b* and a circular port 44, a first waveguide junction having a first common port coupled to a common waveguide 120A—see FIGS. 1A and 1B—of the first diplexer 22 and a first pair of divided ports coupled to a first two of the four side ports 1*a*, 1*b*, 2*a*, 2*b*, and a second waveguide junction having a second common port coupled to a common waveguide 120B—see FIGS. 1A and 1B—of the second diplexer 26 and a second pair of divided ports coupled to a second two of the four side ports 1*a*, 1*b*, 2*a*, 2*b*. See the TEE junctions 40A and 40B of FIGS. 1A, 1B, and 3.

In some embodiments, the antenna feed assembly 60 further includes a first E-plane bend 122A—see FIGS. 1A and 1B—extending between the first layer 50 and the second layer 52 and coupled between the first filter 20A of the first diplexer 22 and the common port of the first diplexer 22, and a second E-plane bend 122B—see FIGS. 1A and 1B—extending between the first layer 50 and the second layer 52 and coupled between the first filter 24A of the second diplexer 26 and the common port of the second diplexer 26.

In some embodiments, the recesses of the second layer 52 define portions of the common waveguides of the first and second diplexers 22 and 26.

In some embodiments, the common waveguide 120A of the first diplexer 22 includes a bend-twist transition section 124A—see FIGS. 1A and 1B—coupled between a first waveguide section and a second waveguide section oriented 90-degrees relative to the first waveguide section. A similar arrangement of a bend-twist transition section 124B and first and second waveguide sections applies with respect to the common waveguide 120B of the second diplexer 26.

In some embodiments, the first waveguide sections are defined by the recesses of the second layer 52, and the bend-twist sections 124A/B and the second waveguide sections are defined by the recesses of the second layer 52 and the recesses of the first layer 50.

In some embodiments, the antenna feed assembly 60 further includes a third layer 54 and a fourth layer 56, the third layer 54 and the fourth layer 56 having respective recesses that define portions of the turnstile junction 42 and the first and second waveguide junctions.

In some embodiments, the antenna feed assembly 60 further includes a fifth layer 58 between the second layer 52 and the third layer 54. The fifth layer 58 has a top surface 78 extending across some of the recesses of the second layer 52 and having a bottom surface 88 extending across some of the recesses of the third layer 54.

In some embodiments, the third layer 54 has a bottom surface 84 extending across some of the recesses of the top surface 76 of the fourth layer 56.

In some embodiments, the recesses of the third layer 54 and the recesses of the fourth layer 56 define first waveguides 126A and 126B—see FIGS. 1A and 1B—between the first pair of divided ports and the first two of the four side ports 1*a*, 1*b*, 2*a*, 2*b* and second waveguides 126C and 126D—see FIGS. 1A and 1B—between the second pair of divided ports and the second two of the four side ports 1*a*, 1*b*, 2*a*, 2*b*.

In some embodiments, each of the first waveguides 126A/B and each of the second waveguides 126C/D comprise the same plurality of waveguide sections—i.e., they are formed or built from like waveguide sections. However, an order of the plurality of waveguide sections of the first waveguides 126A/B is different than an order of the plurality of waveguide sections of the second waveguides 126C/D.

In some embodiments, the first waveguides 126A/B cross over the second waveguides 126C/D at a single location.

In some embodiments, the first waveguides 126A/B and the second waveguides 126C/D are in different ones of the third of fourth layers 54 and 56 at the single location.

In some embodiments, the first waveguides 126A/B and the second waveguides 126C/D extend in orthogonal directions at the single location.

Figure 12:
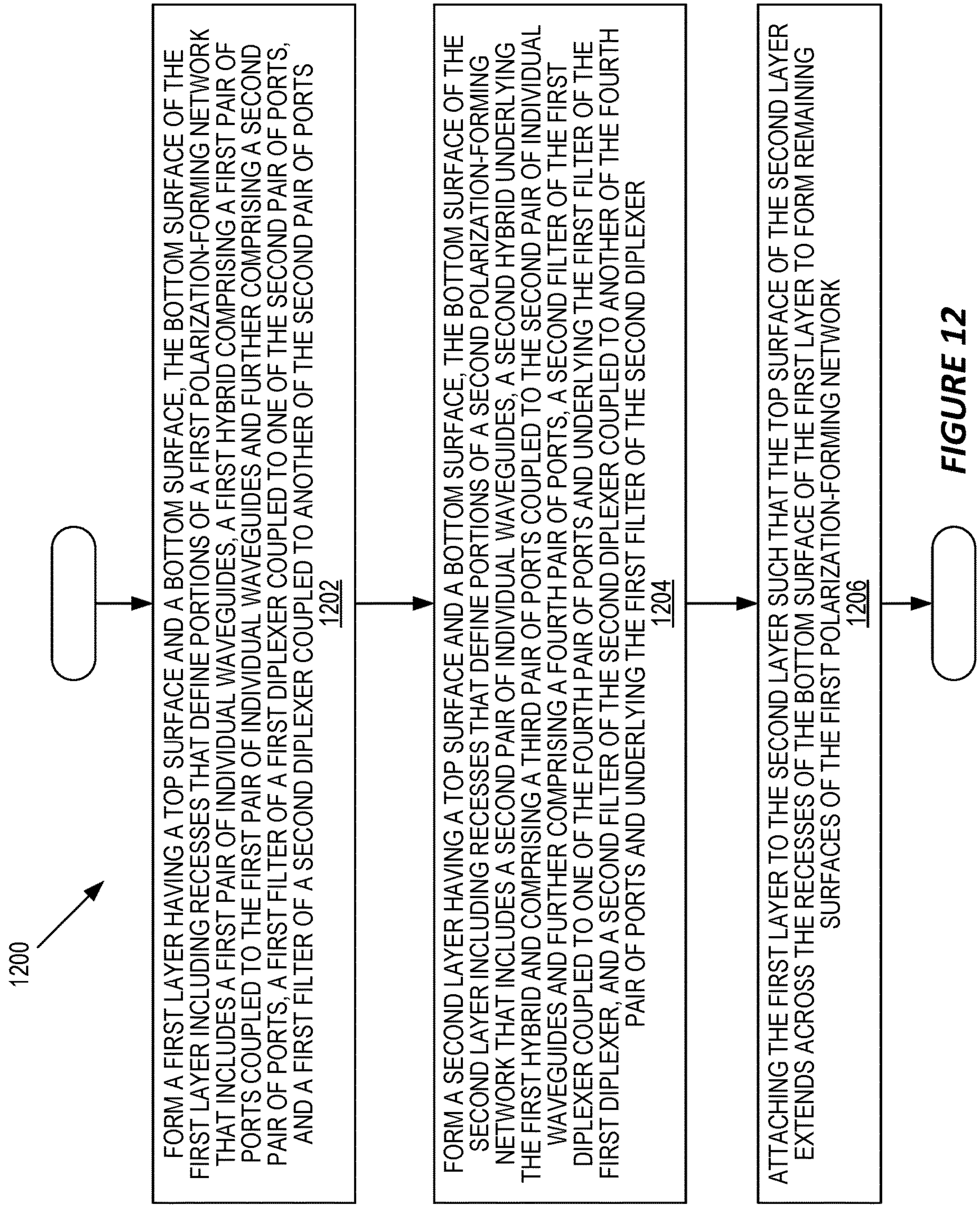
FIG. 12 is a logic flow diagram of a method of manufacturing a multi-layer antenna feed assembly according to one embodiment.

FIG. 12 illustrates another embodiment, which comprises a method 1200 of manufacturing an antenna feed assembly as shown herein. The method 1200 includes forming (Block 1202) a first layer 50 having a top surface 70 and a bottom surface 80. The bottom surface 80 of the first layer 50 includes recesses that define portions of a first polarization-forming network. The first polarization-forming network includes a first pair of individual waveguides 12A and 12B, a first hybrid 14 comprising a first pair of ports 16A and 16B coupled to the first pair of individual waveguides 12A and 12B and further comprising a second pair of ports 18A and 18B, a first filter 20A of a first diplexer 22 coupled to one of the second pair of ports 18A and 18B, and a first filter 24A of a second diplexer 26 coupled to another of the second pair of ports 18A and 18B.

The method 1200 further includes forming (Block 1204) a second layer 52 having a top surface 72 and a bottom surface 82. The bottom surface 82 of the second layer 52 includes recesses that define portions of a second polarization-forming network. The second polarization-forming network includes a second pair of individual waveguides 28A and 28B, a second hybrid 30 underlying the first hybrid 14 and comprising a third pair of ports 32A and 32B coupled to the second pair of individual waveguides 28A and 28B and further comprising a fourth pair of ports 34A and 34B, a second filter 20B of the first diplexer 22 coupled to one of the fourth pair of ports 34A and 34B and underlying the first filter 20A of the first diplexer 22, and a second filter 24B of the second diplexer 26 coupled to another of the fourth pair of ports 34A and 34B and underlying the first filter 24A of the second diplexer 26.

The method 1200 further includes attaching (Block 1206) the first layer 50 to the second layer 52 such that the top surface 72 of the second layer 52 extends across the recesses of the bottom surface 70 of the first layer 50 to form remaining surfaces of the first polarization-forming network.

In some embodiments, a first individual waveguide of each of the first and second pairs of individual waveguides is associated with a first circular polarization, a second individual waveguide of each of the first and second pair of individual waveguides is associated with a second circular polarization, a first port of each of the first and third pairs of ports of the first and second hybrids is associated with a first linear polarization, and a second port of each of the first and third pairs of ports of the first and second hybrids is associated with a second linear polarization.

In some embodiments, the method 1200 further includes providing a turnstile junction 42 comprising four side ports 1*a*, 1*b*, 2*a*, and 2*b*, and a circular port 44. The method 1200 further comprises providing a first waveguide junction having a first common port coupled to a common waveguide of the first diplexer 22 and a first pair of divided ports coupled to a first two of the four side ports 1*a*, 1*b*, 2*a*, 2*b*, and providing a second waveguide junction having a second common port coupled to a common waveguide of the second diplexer 26, and a second pair of divided ports coupled to a second two of the four side ports.

In some embodiments, the method 1200 further includes providing a first E-plane bend extending between the first layer 50 and the second layer 52 and coupled between the first filter 20A of the first diplexer 22 and the common port of the first diplexer 22 and providing a second E-plane bend extending between the first layer 50 and the second layer 52 and coupled between the first filter 24A of the second diplexer 26 and the common port of the second diplexer 26.

In some embodiments, the recesses of the second layer 52 define portions of the common waveguides of the first and second diplexers 22 and 26.

In some embodiments, the common waveguide of the first diplexer 22 includes a bend-twist transition section coupled between a first waveguide section and a second waveguide section oriented 90-degrees relative to the first waveguide section.

In some embodiments, the first waveguide section is defined by the recesses of the second layer 52, and the bend-twist section and the second waveguide section is defined by the recesses of the second layer 52 and the recesses of the first layer 50.

In some embodiments, the method 1200 further includes forming a third layer 54 and a fourth layer 56, the third layer 54 and the fourth layer 56 having respective recesses that define portions of the turnstile junction 42 and the first and second waveguide junctions.

In some embodiments, the method 1200 further includes forming a fifth layer 58 between the second layer 52 and the third layer 54, the fifth layer 58 having a top surface 78 extending across some of the recesses of the bottom surface 82 of the second layer 52 and having a bottom surface 88 extending across some of the recesses of the top surface 74 of the third layer 54.

In some embodiments, the third layer 54 has a bottom surface 84 extending across some of the recesses of the top surface 76 of the fourth layer 56.

In some embodiments, the recesses of the bottom surface 84 of the third layer 54 and the recesses of the top surface 76 of the fourth layer 56 define first waveguides between the first pair of divided ports and the first two of the four side ports 1*a*, 1*b*, 2*a*, 2*b*, and second waveguides between the second pair of divided ports and the second two of the four side ports 1*a*, 1*b*, 2*a*, 2*b*.

In some embodiments, each of the first and second waveguides comprise the same plurality of waveguide sections—i.e., they are formed from like sections—and an order of the plurality of waveguide sections of the first waveguides is different than an order of the plurality of waveguide sections of the second waveguides.

In some embodiments, the first waveguides cross over the second waveguides at a single location.

In some embodiments, the first waveguides and the second waveguides are in different ones of the third of fourth layers at the single location.

In some embodiments, the first waveguides and the second waveguides extend in orthogonal directions at the single location.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An antenna feed assembly, comprising:

a first layer having a top surface and a bottom surface, the bottom surface of the first layer comprising recesses that define portions of a first polarization-forming network, the first polarization-forming network comprising:

a first pair of individual waveguides;

a first hybrid comprising a first pair of ports coupled to the first pair of individual waveguides and further comprising a second pair of ports;

a first filter of a first diplexer coupled to one of the second pair of ports; and a first filter of a second diplexer coupled to another of the second pair of ports;

a second layer having a top surface and a bottom surface, the top surface of the second layer extending across the recesses of the bottom surface of the first layer to form remaining surfaces of the first polarization-forming network, the bottom surface of the second layer comprising recesses that define portions of a second polarization-forming network, the second polarization-forming network comprising:

a second pair of individual waveguides;

a second hybrid underlying the first hybrid and comprising a third pair of ports coupled to the second pair of individual waveguides and further comprising a fourth pair of ports;

a second filter of the first diplexer coupled to one of the fourth pair of ports and underlying the first filter of the first diplexer; and a second filter of the second diplexer coupled to another of the fourth pair of ports and underlying the first filter of the second diplexer.

2. The antenna feed assembly of claim 1, wherein a first individual waveguide of each of the first and second pairs of individual waveguides is associated with a first circular polarization, a second individual waveguide of each of the first and second pair of individual waveguides is associated with a second circular polarization, a first port of each of the first and third pairs of ports of the first and second hybrids is associated with a first linear polarization, and a second port of each of the first and third pairs of ports of the first and second hybrids is associated with a second linear polarization.

3. The antenna feed assembly of claim 1, further comprising:

a turnstile junction comprising four side ports and a circular port;

a first waveguide junction having a first common port coupled to a common waveguide of the first diplexer, and a first pair of divided ports coupled to a first two of the four side ports;

a second waveguide junction having a second common port coupled to a common waveguide of the second diplexer, and a second pair of divided ports coupled to a second two of the four side ports.

4. The antenna feed assembly of claim 3, further comprising:

a first E-plane bend extending between the first layer and the second layer, and coupled between the first filter of the first diplexer and the common port of the first diplexer; and a second E-plane bend extending between the first layer and the second layer and coupled between the first filter of the second diplexer and the common port of the second diplexer.

5. The antenna feed assembly of claim 3, wherein the recesses of the second layer define portions of the common waveguides of the first and second diplexers.

6. The antenna feed assembly of claim 3, wherein the common waveguide of the first diplexer includes a bend-twist transition section coupled between a first waveguide section and a second waveguide section oriented 90-degrees relative to the first waveguide section.

7. The antenna feed assembly of claim 6, wherein the first waveguide section is defined by the recesses of the second layer, and the bend-twist section and the second waveguide section is defined by the recesses of the second layer and the recesses of the first layer.

8. The antenna feed assembly of claim 3, further comprising a third layer and a fourth layer, the third layer and the fourth layer having respective recesses that define portions of the turnstile junction and the first and second waveguide junctions.

9. The antenna feed assembly of claim 8, further comprising a fifth layer between the second layer and the third layer, the fifth layer having a top surface extending across some of the recesses of the second layer and having a bottom surface extending across some of the recesses of the third layer.

10. The antenna feed assembly of claim 8, wherein the third layer has a bottom surface extending across some of the recesses of the fourth layer.

11. The antenna feed assembly of claim 8, wherein the recesses of the third layer and the recesses of the fourth layer define first waveguides between the first pair of divided ports and the first two of the four side ports and second waveguides between the second pair of divided ports and the second two of the four side ports.

12. The antenna feed assembly of claim 11, wherein each of the first and second waveguides comprises like pluralities of waveguide sections, and an order of the plurality of waveguide sections of the first waveguides is different than an order of the plurality of waveguide sections of the second waveguides.

13. The antenna feed assembly of claim 11, wherein the first waveguides cross over the second waveguides at a single location.

14. The antenna feed assembly of claim 13, wherein the first waveguides and the second waveguides are in different ones of the third and fourth layers at the single location.

15. The antenna feed assembly of claim 14, wherein the first waveguides and the second waveguides extend in orthogonal directions at the single location.

* * * * *